H. J. DAVIES & T. A. JUDGE.
MANUFACTURE OF DOUBLE HELICAL METALLIC TUBING.
APPLICATION FILED JAN. 20, 1913.

1,080,897.　　　　　　　　　　　　　Patented Dec. 9, 1913.

UNITED STATES PATENT OFFICE.

HAROLD JOHN DAVIES AND THOMAS ALFRED JUDGE, OF SHEFFIELD, ENGLAND.

MANUFACTURE OF DOUBLE HELICAL METALLIC TUBING.

1,080,897.  Specification of Letters Patent.  Patented Dec. 9, 1913.

Application filed January 20, 1913. Serial No. 743,146.

*To all whom it may concern:*

Be it known that we, HAROLD JOHN DAVIES and THOMAS ALFRED JUDGE, of 61 Norfolk street, city of Sheffield, county of York, England, subjects of the King of Great Britain and Ireland, have invented certain new and useful Improvements in the Manufacture of Double Helical Metallic Tubing, for which we have applied for protection in Great Britain, No. 1,611, January 20, 1912, of which the following is a specification, reference being had to the accompanying drawing.

This invention relates to the method of securing together the strips which form the coils of double helical tubing such as described in prior British Patent No. 26067 of 1909, which we propose to do in the following manner and by the process of electric welding to which we make no claim *per se*.

At the back of the coiling chamber as described in the said prior patent we fix a frame or bracket arranged to carry two power-driven rollers A, and B, which form the terminals of the electric supply as shown in the annexed diagram.

Figure 1:
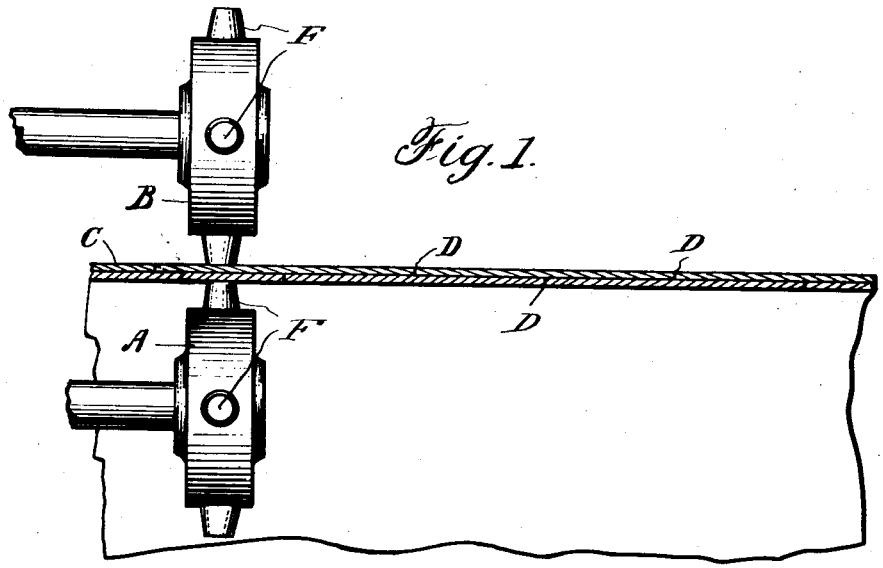
Figure 2:
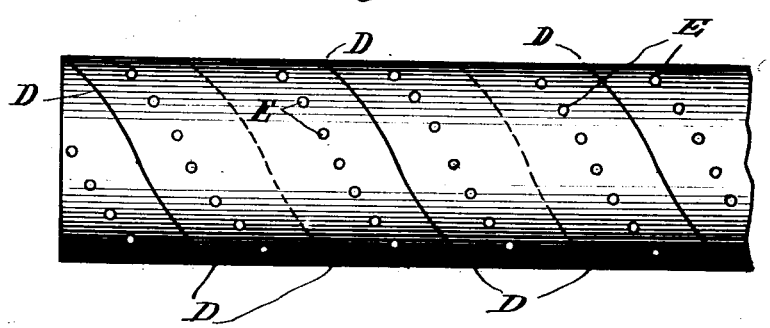

Figure 1 shows the welding electrodes and in section the double strips of metal which form the upper part of the tube, and Fig. 2, the outer face of tube with lines of welding dotted, arranged one above the other and so that one roller will pass into the interior of the coil as it is being formed and the other B, will be outside the coil in a corresponding position.

It is not intended to weld together the extreme edges which abut against each other at D, but only upon a line E parallel with the junction of the outer coils and at a distance from it on each side, of one quarter of the width of the strip or thereabout.

The peripheral speed of the rollers A and B is adjusted to equal the speed of the strips which pass between them, and the rollers with their bearings can be moved farther apart or be forced closer to each other so as to press upon the coil during the process of welding.

The roller terminals are provided with electrodes F, in the form of annular rings projecting from their perimeters at the desired distance apart, when the weld is desired to be continuous, but if an intermittent or broken weld is desired, portions of the collar or annular electrode may be cut away so as to leave a corresponding number of projections or teeth upon each roller, which will produce what is sometimes known as spot-welding.

It will thus be understood that in the case of complete annular electrodes the electric current will be passing continuously and the weld will consequently be continuous, but if portions of the electrode are cut away the current will be broken and the weld will be intermittent.

Having now particularly described and ascertained the nature of our said invention and in what manner the same is to be performed, we declare that what we claim, is:—

The herein described method of manufacturing metallic double strip helically wound tubing which consists in forming the tube with the outer strip overlapping the junction of the edges of the inner strip causing said tube during its manufacture to travel in the direction of its length and simultaneously causing it to rotate about its longitudinal axis and at the same time producing intermittent electric welds or fusions between the inner and outer strips in a line parallel with and spaced from the edge of the outer strip by means of a pair of rotating electrical terminals provided with registering stud shaped electrodes, one of said terminals being located inside and the other outside the walls of the tube, the peripheral speed of said rotating terminals being equal to the speed of the portion of the tube which passes between the terminals.

In witness whereof we have hereunto set our hands in presence of two witnesses.

HAROLD JOHN DAVIES.
THOMAS ALFRED JUDGE.

Witnesses:
ENSOR D. DRURY,
LUTHER J. PARR.